US 8,326,936 B2

(12) United States Patent
Marino et al.

(10) Patent No.: US 8,326,936 B2
(45) Date of Patent: *Dec. 4, 2012

(54) APPARATUS AND METHOD FOR ANALYZING AND FILTERING EMAIL AND FOR PROVIDING WEB RELATED SERVICES

(76) Inventors: Joseph P. Marino, New York, NY (US); Jonathan Fortin, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/015,053

(22) Filed: Jan. 27, 2011

(65) Prior Publication Data

US 2011/0119343 A1 May 19, 2011

Related U.S. Application Data

(63) Continuation of application No. 11/350,905, filed on Feb. 8, 2006, now Pat. No. 7,904,518.

(60) Provisional application No. 60/653,163, filed on Feb. 15, 2005.

(51) Int. Cl.
*G06F 15/16* (2006.01)
*G06F 15/173* (2006.01)

(52) U.S. Cl. ......... 709/206; 709/207; 709/224; 709/226

(58) Field of Classification Search .......... 709/204–207, 709/224–226, 229; 726/22–25
See application file for complete search history.

(56) References Cited

U.S. PATENT DOCUMENTS

| 7,694,135 | B2* | 4/2010 | Rowan et al. | 713/166 |
| 7,797,421 | B1* | 9/2010 | Scofield et al. | 709/224 |
| 7,890,588 | B2* | 2/2011 | Takahashi et al. | 709/206 |
| 2002/0007453 | A1* | 1/2002 | Nemovicher | 713/155 |
| 2005/0005160 | A1* | 1/2005 | Bates et al. | 713/200 |
| 2006/0075028 | A1* | 4/2006 | Zager et al. | 709/206 |
| 2006/0168006 | A1* | 7/2006 | Shannon et al. | 709/206 |
| 2006/0212925 | A1* | 9/2006 | Shull et al. | 726/1 |
| 2006/0259561 | A1* | 11/2006 | Takahashi et al. | 709/206 |
| 2007/0204341 | A1* | 8/2007 | Rand et al. | 726/22 |
| 2007/0271342 | A1* | 11/2007 | Brandt et al. | 709/206 |

* cited by examiner

*Primary Examiner* — Minh-Chau Nguyen
(74) *Attorney, Agent, or Firm* — White-Welker & Welker, LLC; Matthew T. Welker, Esq.

(57) ABSTRACT

The inventive methodology provides an integrated plug and play solution designed to protect home networks against spam, phishing emails, viruses, spyware as well as other similar threats. The described content filtering appliance can be used for processing of web and email traffic implemented and can be deployed as a stand-alone appliance. In one implementation, the content processing appliance utilizes backend content filtering provided by a remote scanning service accessed via a network. The system employs network level analysis and translation of content and executes various procedures to handle the network traffic. In an embodiment of the invention, the appliance is provided with an automatic remote updating capability, wherein the software and data used by the appliance can be updated remotely via a network. Finally, the appliance may also implement parental controls.

13 Claims, 9 Drawing Sheets

APPARATUS AND METHOD FOR ANALYZING AND FILTERING EMAIL AND FOR PROVIDING WEB RELATED SERVICES

CROSS REFERENCE TO RELATED APPLICATIONS

This application claims priority from and is a continuation of U.S. patent application Ser. No. 11/350,905, entitled "Apparatus and method for analyzing and filtering email and for providing web related services", filed on Feb. 8, 2006, now U.S. Pat. No. 7,904,518 which claims priority from U.S. Provisional Patent Application No. 60/653,163, filed on Feb. 15, 2005, both of which are incorporated by reference in its entirety for all purposes as if fully set forth herein.

SEQUENCE LISTING OR PROGRAM

Not Applicable

FEDERALLY SPONSORED RESEARCH

Not Applicable

TECHNICAL FIELD OF THE INVENTION

The present invention generally relates to computer security and more specifically to an appliance for processing email and web traffic.

BACKGROUND OF THE INVENTION

Spamming is an abuse of an electronic communications medium to initiate unsolicited communications in bulk. The most common type of spamming is sending email spam, which involves using email protocol(s) to send multiple identical messages to electronic mailboxes of numerous recipients. Estimated 70% of all email traffic can be characterized as spam. The spamming became especially widespread because of low costs of sending email messages. However, it imposes a significant burden on the Internet users, businesses and Internet service providers.

Spammers obtain email addresses of potential targets using, for example, web tools, which extract email addresses from web pages. The unsolicited email messages sent by email spammers most often contain commercial advertisements. Some spam messages may also include identity fraud content, which is called "phishing."

A phishing email looks just like an email from the user's bank, or from a legitimate online business such as eBay or Amazon, or from another organization that the user should be able to trust. The email usually asks the user to click a link and verify information about the user's account. The link provided in the email leads the user to a site that looks real. If the unsuspecting user provides the requested information, it becomes compromised. In addition to spam and phishing emails, the user may also be exposed to various forms of "malware", which includes computer viruses, spyware as well as other threats.

Various filtering techniques have been developed to combat threats present in email and web content. Most of those techniques are based on Bayesian filtering technology. Unfortunately, in order to be effective, the Bayesian filter needs to be extensively "trained" by the human user. However, in a home environment, the user may not wish to engage in such "training." The home network user may desire a simple plug-and-play appliance, which would provide email and web content filtering capabilities without human intervention.

Therefore, the existing technology does not provide an integrated network protective solution for home use, which does not require extensive human interaction.

SUMMARY OF THE INVENTION

The inventive methodology is directed to methods and systems that substantially obviate one or more of the above and other problems associated with conventional techniques for protection from spam and malware.

One aspect of the inventive methodology is a method for filtering a content of an email message sent to a user. The inventive method involves reading the email message, checking a sender of the email message against a blacklist, checking the sender of the email message against a whitelist, checking a recipient of the email message against a parental control list, checking the email message for phishing scam and checking the header of the email message for SPAM content. The message is allowed or denied based on the results of the aforesaid checks.

Another aspect of the inventive methodology is a method for filtering a content of a web resource requested by a user. The requested web resource being located on a target web server. In accordance with the inventive method, a user request for the web resource is intercepted. The inventive system requests from the target web server the source code for the resource and receives the source code of the requested source from the target web server. The source code of the resource is inspected for at least one threat. If such a threat is detected, a warning message is displayed to the user alerting the user about the detected threat.

Yet another aspect of the inventive concept is an apparatus for filtering a content of an email message sent to a user. The inventive apparatus includes central processing unit (CPU), a first network interface coupled to the computer of the user; a second network interface coupled to the external network and a memory storing a set of computer-readable instructions. Under the direction of the stored instructions, the CPU reads the email message; checks a sender of the email message against a blacklist, checks the sender of the email message against a whitelist, checks a recipient of the email message against a parental control list, checks the email message for phishing scam and checks the header of the email message for SPAM content. The email message is allowed or denied based on the results of the aforesaid checks.

A further aspect of the inventive methodology is an apparatus for filtering a content of a web resource requested by a user. The requested the web resource being located on a target web server. The inventive apparatus includes a central processing unit (CPU), a first network interface coupled to the computer of the user, a second network interface coupled to the external network and a memory storing a set of computer-readable instructions. The CPU operating under the direction of the stored instructions intercepts a user request for the web resource, requests from the target web server the source code for the resource, receives the source code of the requested source from the target web server and inspects the source code of the requested resource for at least one threat. If the CPU determines that at least one threat is present, it causes a warning to be displayed to the user alerting the user about the detected threat.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION OF THE INVENTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

An embodiment of the inventive methodology provides an integrated plug and play solution designed to protect home networks against spam, phishing emails, viruses, spyware as well as other similar threats. The inventive content filtering appliance can be used for processing of web and email traffic implemented and can be deployed as a stand-alone appliance. In an embodiment of the invention, the content processing appliance utilizes backend content filtering provided by a remote scanning service accessed via a network. The inventive system employs network level analysis and translation of content and executes various procedures to handle the network traffic. In an embodiment of the invention, the appliance is provided with an automatic remote updating capability, wherein the software and data used by the appliance can be updated remotely via a network.

Figure 1:
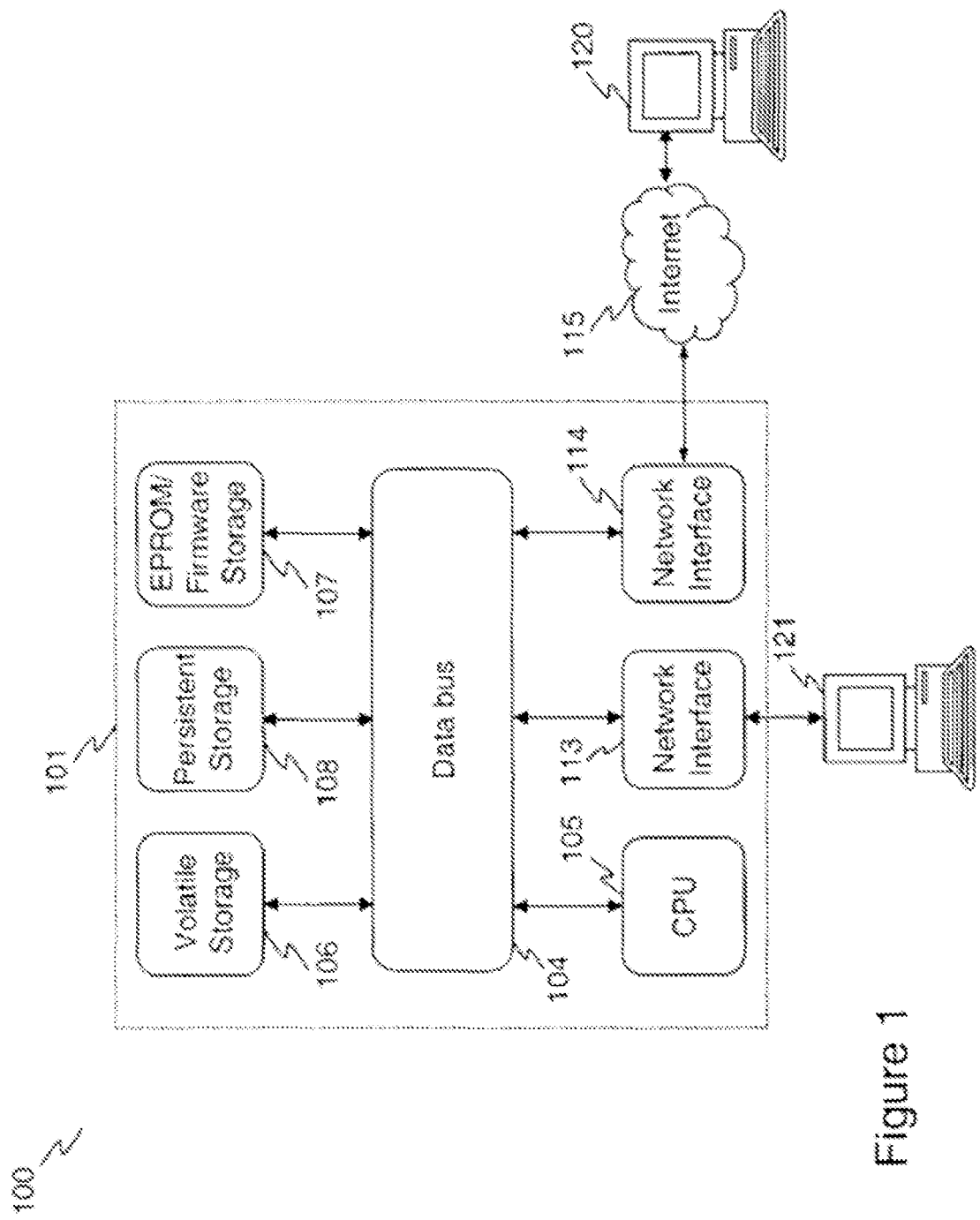
FIG. 1 depicts a schematic diagram of an exemplary embodiment of an inventive network appliance for filtering and otherwise processing email communications as well as other network content.

FIG. 1 depicts a schematic diagram 100 of an exemplary embodiment of an inventive network appliance 101 for filtering and otherwise processing email communications as well as other network content. With reference to FIG. 1, the inventive appliance may include a data bus 104 or other communication mechanism for communicating information across and among various parts of the appliance 101, and a processor (CPU) 105 coupled with bus 104 for processing information and performing other computational and control tasks. In one embodiment of the invention the processor 105 is an ARM processor with clock speed of at least 10 MHz. Appliance 101 also includes a volatile storage 106, such as a random access memory (RAM) or other dynamic storage device, coupled to bus 104 for storing various information as well as instructions to be executed by processor 105. The volatile storage 106 also may be used for storing temporary variables or other intermediate information during execution of instructions by processor 105. In one embodiment of the invention, the size of the memory unit 106 is at least 10 MB. The appliance 101 may further include a read only memory (ROM or EPROM) 107 or other static storage device coupled to bus 104 for storing static information and instructions for processor 105, such as basic input-output system (BIOS), as well as various system configuration parameters. A persistent storage device 108, such as a magnetic disk, optical disk, or solid-state flash memory device is provided and coupled to bus 104 for storing information and instructions.

The embodiment of the appliance 101 shown in FIG. 1 also includes at least two communication interfaces, such as network interfaces 113 and 114 coupled to the data bus 104. Communication interfaces 113 and 114 provide a two-way data communication coupling to a network link 114 that is connected to the network 115. For example, communication interfaces 113 and 114 may be 10/100 Mbps local area network interface cards (LAN NIC) to provide a data communication connection to a compatible LAN. Wireless links, such as well-known 802.11a, 802.11b, 802.11g and Bluetooth may also used for network implementation. In any such implementation, communication interfaces 113 and 114 send and receive electrical, electromagnetic or optical signals that carry digital data streams representing various types of information.

Network link 113 typically provides data communication through one or more networks to other network resources. For example, network link 114 may provide a connection through network 115 to a host computer 120, or to other network resources (not shown). Thus, the appliance 101 can access network resources located anywhere on the Internet 115, such as a remote network storage or web servers. On the other hand, the appliance 101 may also be accessed by user computer 121 located anywhere on the corresponding local area network.

Local network (not shown) and the Internet 115 both use electrical, electromagnetic or optical signals that carry digital data streams. The signals sent through the various networks and the signals on network links 113 and 114, which carry the digital data to and from appliance 101, are exemplary forms of carrier waves transporting the information.

The appliance 101 can send messages and receive data, including program code, through the variety of network(s) including any local area network as well as the Internet 115 by means of network links 114 and 113. For example, when the system 101 acts as a network server, it might transmit a requested code or data for an application program running on user's computer 121 client(s) and/or the host 120 through any local area network (not shown) as well as the Internet 115. Similarly, it may receive code or data from other network entities.

The received code may be executed by processor 105 as it is received, and/or stored in persistent or volatile storage devices 108 and 106, respectively, or other non-volatile storage for later execution. In this manner, the appliance 101 may obtain application code updates from remote network resources.

The appliance 101 may also use the network interface 114 to receive various code and data updates, which it may use in its operation. For example, such data updates may include latest virus definition files. For this purpose, the appliance may perform periodic checks to determine whether such updates are available. The appliance 101 may also user network interfaces 114 to issue requests to remote network resources, such as remote virus scanning services and to receive the appropriate responses. Finally, the user may connect to the appliance through, for example, network interface 113 in order to perform necessary configuration of the appliance.

In one embodiment of the invention, one or both of the network interfaces 113 and 114 may be a wireless network interface operating in accordance with a wireless networking protocol, such as Bluetooth, 802.11a, 802.11b and/or 802.11g. In another embodiment both interfaces 113 and 114 are conventional wire-based network interfaces.

Figure 2A:
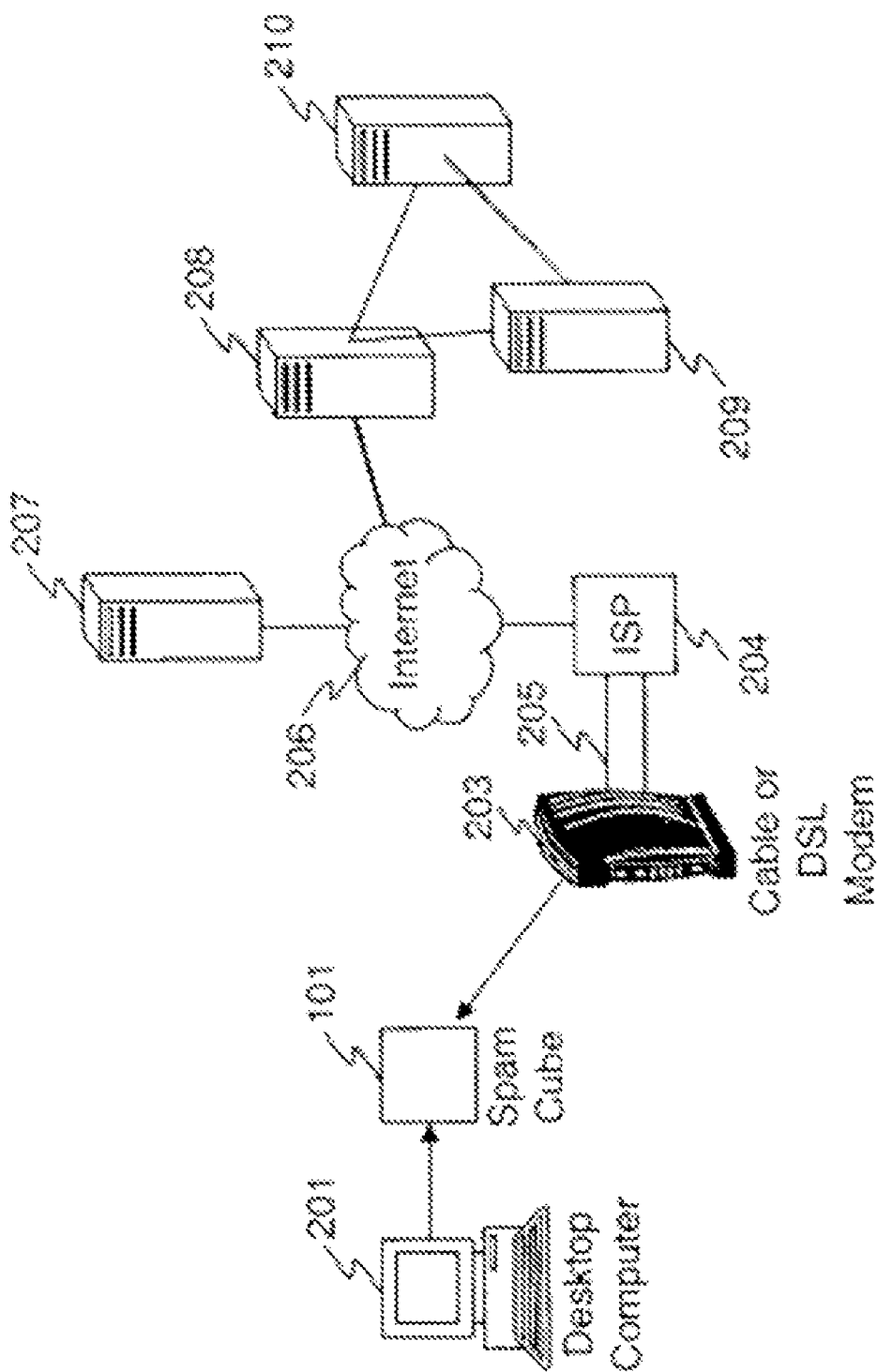
FIG. 2A illustrates exemplary configuration of the inventive appliance configured to protect a single desktop computer.

FIG. 2A illustrates an exemplary home network configuration, wherein the inventive appliance 101 is configured to protect a single desktop computer 201. In this exemplary configuration, the inventive appliance 101 is installed between the DSUcable modem and the user's desktop computer, such that all network traffic between the user's computer 201 and the outside network passes through the appliance. To this end, the user's computer 201 is connected to one of the aforementioned two network interfaces 113 and 114, while the other interface is coupled with the cable/DSL modem 203. The modem 203, in turn is connected via connection 205 with ISP 204, which enables the user's computer to access the internet 206.

Figure 2B:
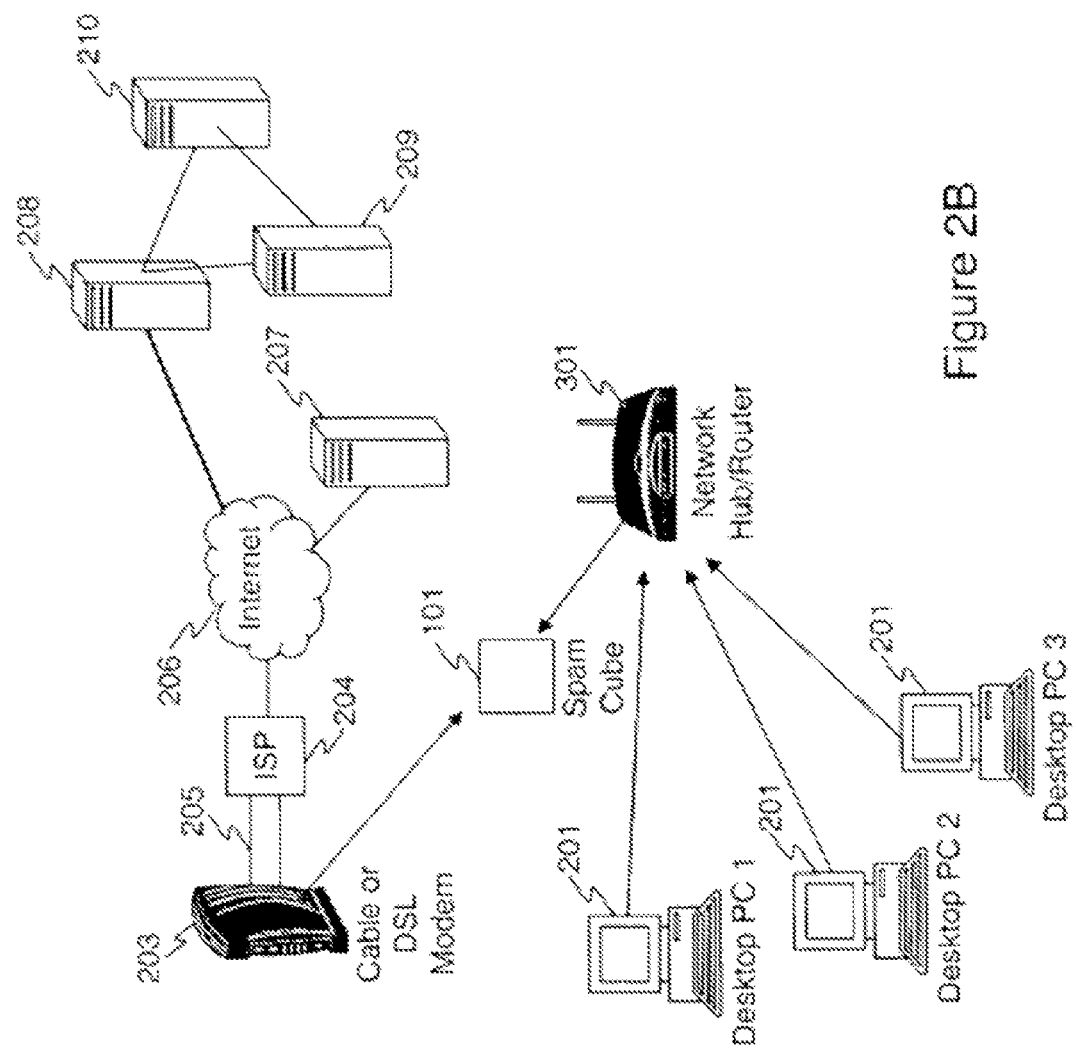
FIG. 2B illustrates exemplary configuration of the inventive appliance connected configured to protect a local area network (LAN), which includes multiple desktop computers.

FIG. 2B illustrates an exemplary configuration of home network 300, which includes the inventive appliance 101 configured in a manner designed to protect a local area network (LAN), which includes multiple desktop computers 201. In this configuration, the appliance 101 is installed between the cable/DSL modem 203 and the network hub/router 301, which provides network connectivity to the desktop computers 201. In this configuration, the inventive appliance 101 filters all network traffic reaching the computers 201. The network hub 301 may be wireless network-enabled. In an alternative embodiment of the invention, the network hub 301 may be integrated with the inventive appliance 101. The integrated hub may also be either wireless or wired. The other element of the networking configuration shown in FIG. 2b, including cable/DSL modem 203, connection 205, ISP 204 are generally equivalent to the corresponding elements of FIG. 2a, described hereinabove.

Figure 3:
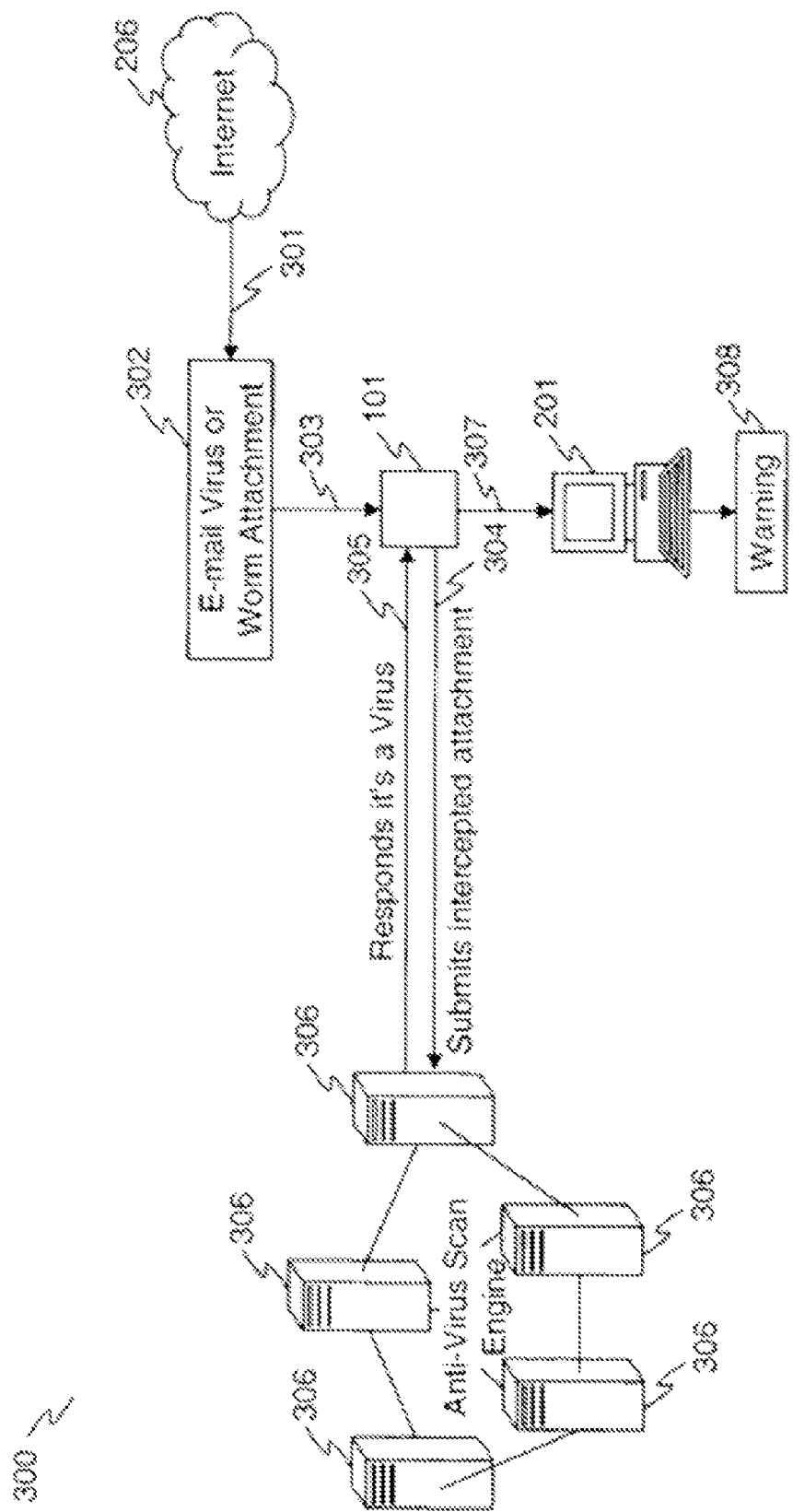
FIG. 3 illustrates exemplary operating sequence of the inventive network appliance configured to process email traffic.

FIG. 3 illustrates exemplary operating sequence of the inventive network appliance configured to process email traffic. In accordance with the illustrated sequence, email message 302 is sent by an entity located on the external network (e.g. Internet) 206 to the user's computer 201. The message 302 may contain one or more attachments, which may include certain malware, such as viruses, worms or other threats. In order to facilitate protection of the user's personal computer from the threats contained in the email 302, the inventive appliance 101, is arranged to intercept the email message 302. Upon the interception of the message 302 by the appliance 101, the appliance 101 performs an initial inspection of the received email message and its attachment(s) and, if necessary, submits a service request 304 to the remote antivirus scanning engine 306. The aforementioned service request may direct the external virus scanning service to perform a virus check of any attachments to the email message 302. In order to enable the requested scanning, the appliance 101 may include the corresponding attachments with the request 304. In an embodiment of the invention, the appliance 101 requests the anti-virus scanning of only specific attachment types. For example, during the initial inspection, the inventive appliance 101 may determine whether the attached file is an executable and, requests remote scanning of the attachment based on the results of this determination.

The remote virus scanning service may be implemented at a remote site using a stand-alone server or a plurality of servers interconnected into a cluster for increased fault-tolerance and improved load handling capacity. In one embodiment of the invention, the virus scanning is implemented as a web service, operating in accordance with one of the well-known web service protocols, such as SOAP protocol. In one embodiment of the invention the remote scanning engines 306 are implemented using artificial intelligence programming. The outside scanning engines are configured to communicate with the inventive appliance to provide the information on the latest SPAM, Internet identity fraud (phishing) and spyware threats. Additionally, the scan engines 306 may be configured to receive email communications from multiple appliances 101 containing information on the detected threats in order to improve the utilized scanning algorithm. Specifically, the scan engines 306 and the inventive appliance 101 may interact in a peer-to-peer manner.

The scan engines 306 may implement content filtering techniques based on neural networks, lexical analysis, natural language processing as well as machine learning. Moreover, the intelligent content analysis provided by the scan engines 306 may be based on known techniques for advanced data mining, pattern matching and knowledge representation. However, as would be appreciated by those of skill in the art, the specific details of organization of the remote virus scanning service are not critical to the concept of the present invention.

After receiving the request 304 from the inventive appliance 101, together with the relevant attachment email files, the remote scanning system 306 performs the necessary processing of the email attachments and determined the presence of any threats therein in accordance with well-known scanning algorithms. The scanning system may utilize a plurality of alternative scanning algorithms. The exact algorithm used by the system may be selected by the user of the inventive appliance 101 during the configuration process. The user's selection may be stored in the storage devices 106, 107 or 108 of the appliance 101. Existing scanning products which may be used by the scanning system 306 include, without limitation, Norton Antivirus and McAfee Security software.

The use of the remote scanning service 306 enables the inventive system to perform scanning operations in an on-demand manner without providing the appliance 101 with the processing power required to perform the scanning operation. In addition, the scanning software executing on servers 306 may be easily and conveniently updated. The aforementioned two features of the inventive system configuration enable the appliance 101 to be implemented using inexpensive hardware.

After the completion of the scanning process, the external scanning engine 306 responds to the appliance 101 with response 305 containing information on any detected threats. For example, the response 305 may indicate that one or more of the attachments to the email contain viruses. Upon receipt of the response, the appliance 101 neutralizes the detected threat, by, for example, removing the infected attachment, and re-writes the received email message 302 to include appropriate warning to the user. The aforesaid warning may be placed either in the subject line or in the body of the message. The re-written email containing the warning 308 is then forwarded by the appliance 101 to the user's computer 201. Finally, the appliance 101 performs the update of its statistics information.

Figure 4:
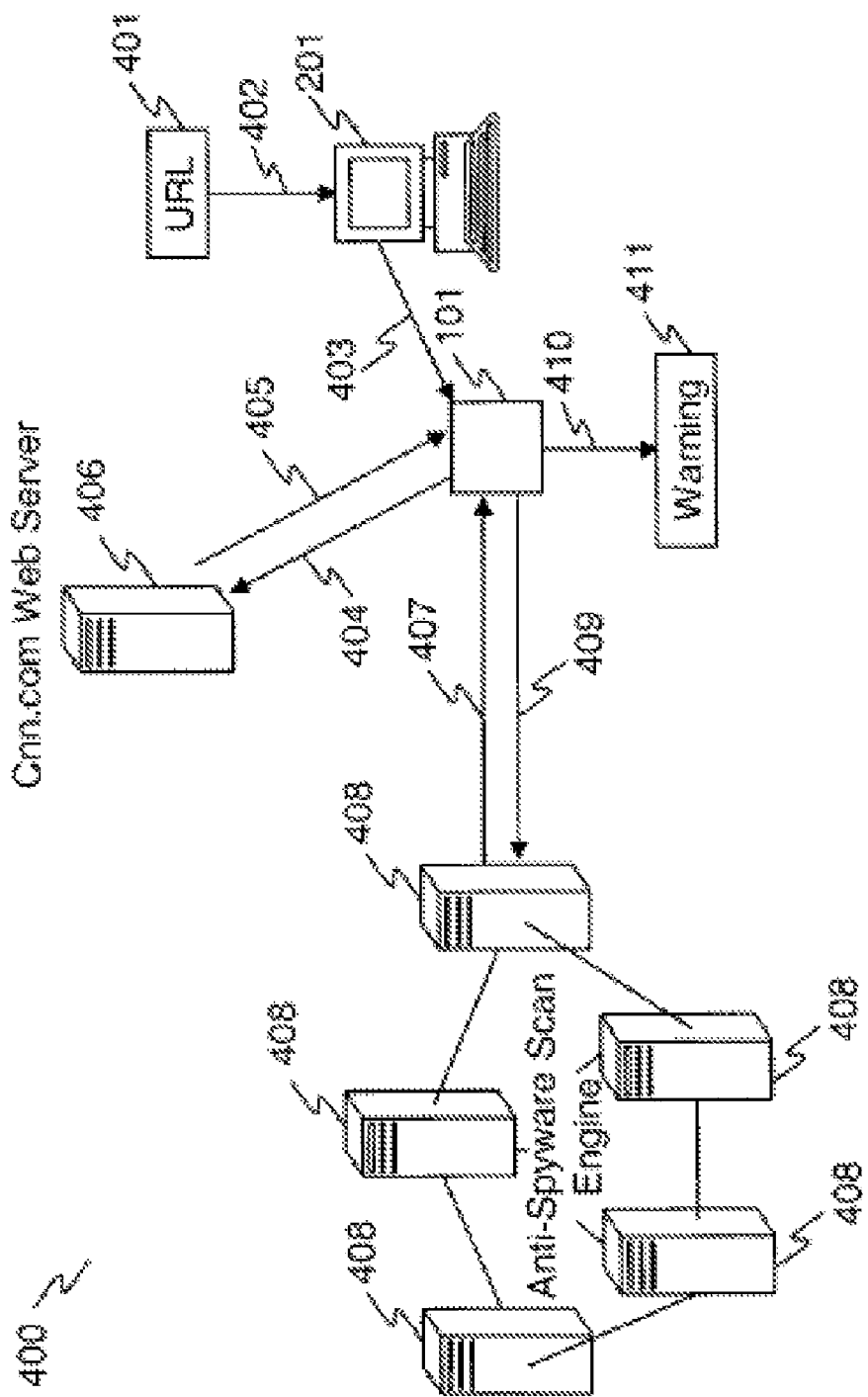
FIG. 4 illustrates exemplary operating sequence 400 of the inventive network appliance configured to process various web content viewed by a user using user's computer.

FIG. 4 illustrates exemplary operating sequence 400 of the inventive network appliance configured to process various web content viewed by a user using user's computer. The depicted process is initiated when a user requests a web resource by inputting at 402 URL 401 into a web browser window on user's computer 201. Upon the receipt of the URL information 401, the browser sends HTTP request 403 requesting the target web service (in the example shown in FIG. 4) to provide the resource specified by the received URL. The request 403 is intercepted by the inventive appliance 101, which contacts the target web server 406 on behalf of the user and sends a request 404 for the source code of the web resource specified by the user. In response to the received request, the target server 406 sends a reply message 405, accompanied with the full source code of the requested resource. The inventive appliance 101 receives the code furnished by the web server 406 and initiates a scan of the received source code for any possible threats, including, for example, any spyware.

During the scan process, the inventive appliance 101 may use the a remote scan engine 408 to achieve most comprehensive threat detection. To this end, the appliance 101 may send a request 409 to the remote network of scan engines 408 containing the entire source code of the web resource, or any portion thereof. The outside scan engines 408 examine the content of the received source code and send reply 407 to the inventive appliance, indicating whether any potential threats were detected. Upon the receipt of the reply 407, the inventive appliance 101 sends at 410 a warning message 411 to be displayed in the user's in the browser window, waning the user of the presence of any potential threats within the requested web resource. In an embodiment of the inventive system, after the appropriate warning is displayed to the user, the user is provided with an option to either avoid viewing potentially harmful web resource or to proceed with the viewing despite the shown warning.

Figure 5A:
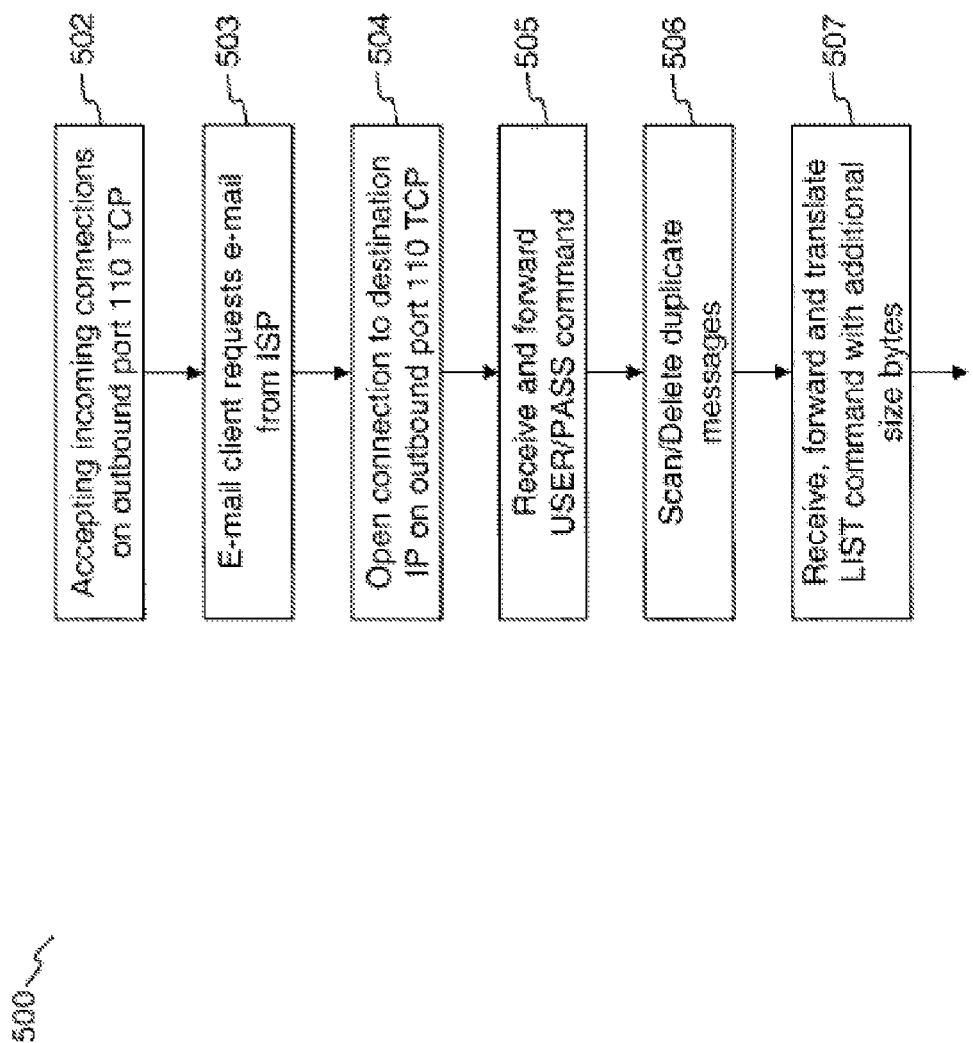
FIGS. 5a, 5b, 6a and 6b provide more detailed illustration of the internal operating sequence of an embodiment of the inventive appliance.

FIGS. 5a, 5b, 6a and 6b provide more detailed illustration of the internal operating sequence of an embodiment of the inventive appliance. Specifically, FIG. 5a depicts the first phase 500 of that exemplary operating sequence. The shown operating sequence is executed by the CPU 105 shown in FIG. 1. In order to enable the appliance to execute the described procedures, the inventive appliance may be provided with an operating system, which may be pre-loaded into one or more of the storage devices 106, 107 and 108 of FIG. 1. Exemplary operating systems which may be used to control appliance 101 include Linux, UNIX (example: BSD), or RTOS (example: VxWorks).

The process illustrated in FIG. 5a is automatically initiated when, at step 502, the appliance 101 accepts a connection from user's computer 201 on the outbound port 110, corresponding to TCP/IP protocol, well known to persons of skill in the art. Through the established connection, at step 503, the appliance 101 intercepts a request generated by user's email client software to retrieve messages corresponding to user's email account from the internet service provider (ISP). At step 504, the inventive appliance opens a connection to the destination IP address corresponding to the email service subsystem of the ISP. At step 505, the inventive system receives authenticating information, such as username and password, corresponding to user's email account with the ISP. The inventive system uses the received authentication information to establish a session with the remote email service and, at step 506, sends to this service a command to scan the user's mailbox for duplicate messages and, when appropriate, to delete them. At step 507, the inventive system receives the "LIST" command from the user's email client and forwards it to the email service system. The aforesaid list command request the email service to provide the listing of all emails in the user's email account.

Figure 5B:
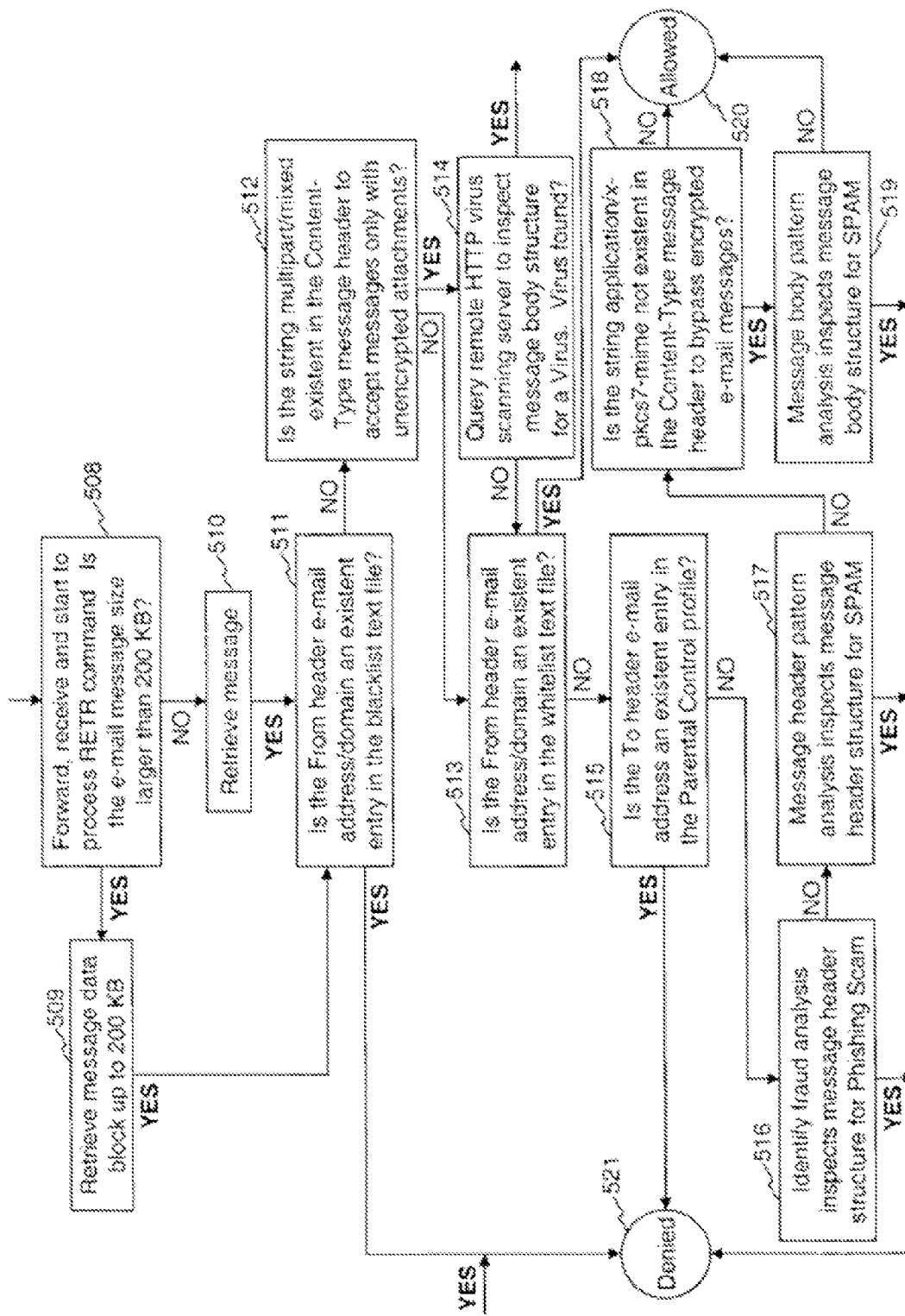

The continuation of the first phase 500 of the process shown in FIG. 5a is illustrated in FIG. 5b. At step 508, the inventive appliance receives from the user's email client the "RETR" command, which requests the remote email subsystem to retrieve one or more email messages in the user's email account. Upon the receipt of this command from the email client, the appliance 101 forwards it to the email server, which, in response, begins message retrieval process. Prior to retrieving a specific message, the appliance 101 first performs a check of the message size. If the size of the message is less than a predetermined threshold value, for example, 200 KB, the system retrieves the entire message, see step 510. On the other hand, if the size of the message exceeds the aforesaid threshold, only a block of the message is retrieved, see step 509. In one embodiment of the inventive system, the size of the retrieved block is 200 KB. However, other block sizes may be used instead.

Upon the retrieval of the message, the inventive system first checks if the sender of the message identified in the "From" field thereof matches an existing entry in the blacklist table. This table lists all senders, the email correspondence from which should be blocked. If the match in the blacklist table is found, the corresponding email message is blocked at step 521.

At step 512, the inventive appliance checks whether the content of the message, as described by the "Content-Type" field of the message header, may include encrypted attachments. If the message contains only unencrypted attachments, the operation proceeds to step 514, whereupon the system requests the remote HTTP virus scanning server to perform the scanning of the message body for viruses. If the virus is found, the system blocks the message at step 521. If, no virus is found or if the message may contain encrypted attachments, the operation of the inventive system proceeds to step 513, whereupon the sender of the message, which is identified in the corresponding "From" record is compared with entries in the whitelist table. This table contains a list of sender email addresses email correspondence from which should be allowed without further inspection. If the sender address matches one of the aforesaid whitelist entries, the email message is allowed at step 520.

On the other hand, if the message sender email address does not match any entries in the whitelist, the system checks the recipient of the email message identified in the "To" field of the message header against entries in the parental control profile. This profile includes email addresses of recipients, which should not receive email messages. If the match is found, the email message is again blocked at step 521. If no matching entries in the parental control profile exist, the system proceeds with step 516, whereupon the identity fraud analysis algorithm inspects the header of the email message for possible phishing scam. If such scam is detected, the message is again blocked at step 521.

Upon passing of the phishing scam inspection, the message header pattern is analyzed at step 517 for SPAM content. Again, if SPAM is detected, the message is blocked at step 521.

If the SPAM is not detected in the header, at step 518, the inventive system checks whether the message header indicates presence of encrypted email message. The encrypted content is indicated, for example, by presence of "Content-Type: application/x-pkcs7-mime" record in the header of the email. If the content is not encrypted, the inventive system inspects the body of the message for SPAM content at step 519. If the SPAM is not detected or if the email body is encrypted, the system accepts the email at step 520.

Figure 6A:
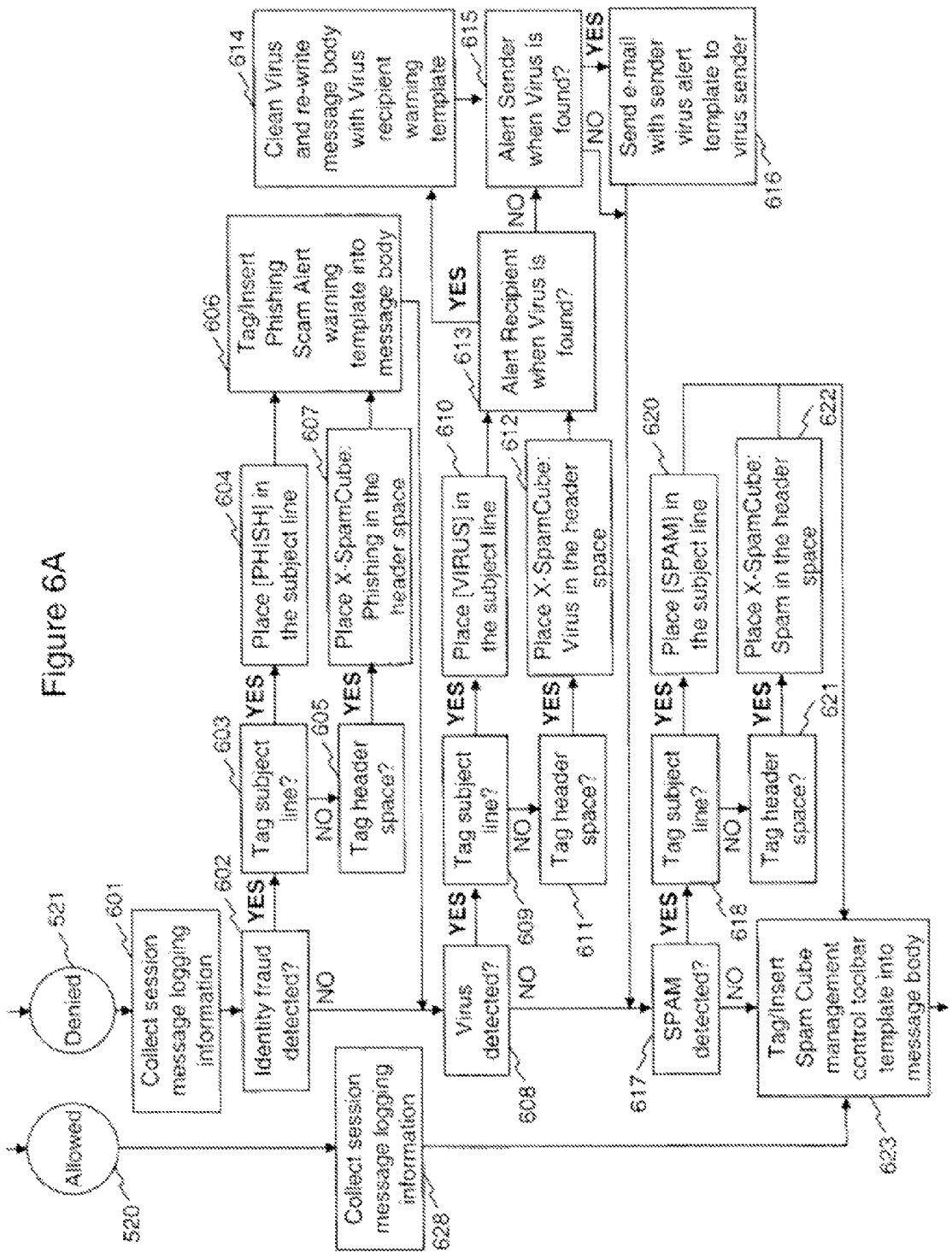

After the email is rejected at step 521 or accepted at step 520, the system performs certain logging and user notification operations illustrated in FIG. 6A. Specifically, is the email is allowed or denied, the collects and stores the session logging information at steps 628 and 601, respectively. In case of a denial, the appliance at step 602 verifies whether identity fraud was detected in the email content. If this was the case, the email is tagged by placing an appropriate message, such as "[PHISH]" either in the subject line (step 603) or, alternatively, in the header of the email message (step 607), depending on the configuration parameters specified by the user. The system may further insert phishing scam alert into the body of the message at step 606.

The system then proceeds with the determination of whether a virus was detected in the email, see step 608. If the virus was found, the appliance again performs tagging of the email either in the subject line or in the header, depending on the user's configuration, at steps 609-610 and 611-612, respectively. If the user's parameters call for recipient notification of virus-containing emails, the system disables the virus and re-writes the message body inserting an appropriate virus warning (steps 613 and 614). If the configuration requires sender notification, the inventive appliance generates an email message to the sender of the virus-containing email, which includes a message alerting the sender of the email message of the virus (step 616).

If the SPAM was detected in the email message, the email is likewise tagged either in the subject or the header, at steps 618, 620 and 621-622, respectively. Finally, at step 623, the inventive system inserts a management control toolbar into the message body.

Figure 6B:
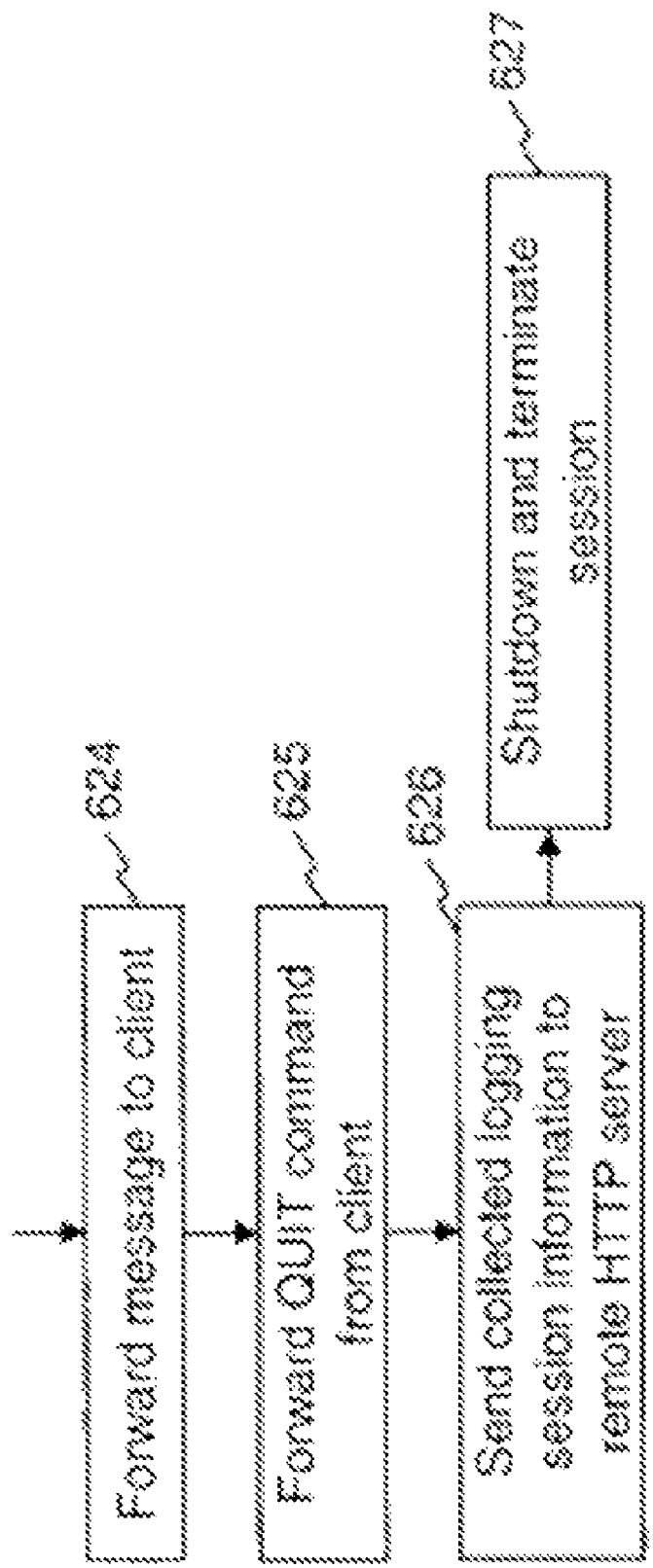

The continuation of the described operating process is illustrated in FIG. 6B. With reference to this figure, the tagged email with the inserted management toolbar is forwarded to the client at step 624. The client terminates the session at step 615 with the QUIT command, which the inventive system forwards to the remote email server. Finally, at step 626, the system sends the collected logging information to a remote HTTP server for storage. The shutdown and session termination is performed at step 627.

The inventive system logs detailed information on the accepted and rejected messages, as well as the detected threats. Upon the request by the user, the logged information may be displayed in a text or graphical form.

It should be noted that the present invention is not limited to any specific email or web communication protocols. The inventive content processing appliance may be utilized in connection with any known communication protocols, including, without limitation, POP3, SMTP or HTTP.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, ASP.NET, Java, Ruby, AJAX, Rails etc.

Moreover, other implementations of the invention will be apparent to those skilled in the art from consideration of the specification and practice of the invention disclosed herein. Various aspects and/or components of the described embodiments may be used singly or in any combination in the computerized content filtering system. It is intended that the specification and examples be considered as exemplary only, with a true scope and spirit of the invention being indicated by the following claims.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A method for filtering a content of an email message, the method comprising:
connecting an inventive network hardware appliance to an external network; including a central processing unit (CPU) on the inventive network hardware appliance; providing a memory for storing a set of computer-readable instructions executed by the central processing unit (CPU) on the inventive network hardware appliance; connecting the inventive network hardware appliance to one or more user computers; arranging the inventive network hardware appliance to intercept an email message; implementing a remote scanning service at a remote site using a stand-alone server or a plurality of servers configured to communicate with the inventive network hardware appliance to provide information on detected threats; intercepting the email message by the inventive network hardware appliance;
reading the email message;

checking a sender of the email message against a blacklist;
checking the sender of the email message against a whitelist;
checking the email message for phishing scam;
checking the email message for SPAM content;
generating results based on the checks performed by the inventive network hardware appliance; submitting a service request to the remote scanning service from the inventive network hardware appliance; determining if the email message contains an encrypted attachment before sending the service request to the remote scanning service; sending the service request from the inventive network hardware appliance to the remote scanning service only if the email message does not contain an encrypted attachment allowing or denying the email message based on the results and a response from the remote scanning service indicating if any threats were detected; modifying the email message to neutralize the detected threat and forwarding the modified email message to the user.

2. The method of claim 1, further comprising reading the message from a remote email system.

3. The method of claim 2, further comprising, before the reading, authenticating with the remote email system using authentication information provided by the user.

4. The method of claim 1, further comprising, determining if the email message is encrypted, and if the email message is not encrypted, checking the email message for SPAM content.

5. The method of claim 4, wherein checking the body of the email message for SPAM content comprises performing matching the content of the email message against a list of keywords.

6. The method of claim 1, wherein the service request includes attachments to the email message and directs the remote scanning service to perform a threat check of the attachments, and wherein the response from the remote scanning service to the inventive network hardware appliance includes information on threats detected by the remote scanning service.

7. The method of claim 1, wherein the checking the header of the email message for SPAM content comprises verification of the format of the header of the email message.

8. The method of claim 1, wherein the checking the email message for SPAM content comprises checking the sender of the email message against a list of known spammers.

9. The method of claim 1, wherein the email message is read from a web mail account of the user using HTTP protocol.

10. The method of claim 1, wherein the email message is read using an email protocol.

11. The method of claim 1, further comprising, in response to detection of at least one threat in the email message, modifying the email message to alert the user about the detected threat and forwarding the modified email message to the user.

12. The method of claim 1, further comprising accumulating statistics about a threat detected in the email message.

13. An inventive network hardware appliance for filtering a content of an email message sent to a user, the inventive network appliance comprising:
 a. A central processing unit (CPU);
 b. A remote scanning service;
 c. A first network interface connected to one or more user computers;
 d. A second network interface connected to the external network;
 e. A memory storing a set of computer-readable instructions, which, when executed by the CPU cause the CPU to:
 i. Read the email message;
 ii. Check a sender of the email message against a blacklist;
 iii. Check the sender of the email message against a whitelist;
 iv. Check the email message for phishing scam;
 v. Check the email message for SPAM content;
 vi. Performing at least one of (ii) through (v) by the remote scanning service pursuant to a request from the inventive network hardware appliance, the request being sent after receiving of the email and confirming an attachment to the email message; and
 vii. Allow or deny the email message based on the results of the (ii) through (vi) and a response from the remote scanning service to a service request,
  the service request being sent to the remote scanning service after the reading of the email message by the CPU, and
  wherein the remote scanning service performs anti-virus scanning operations on the email message, wherein the service request includes attachments to the email message and directs the remote scanning service to perform a threat check of the attachments wherein the inventive network appliance determines whether the email message contains an encrypted attachment before sending the service request to the remote scanning service, and
  wherein the inventive network hardware appliance sends the service request only if the email message does not contain an encrypted attachment, and in response to detection of at least one threat in the email message, modifying the email message to neutralize the detected threat and forwarding the modified email message to the user.

* * * * *